United States Patent [19]

Kutrieb et al.

[11] Patent Number: 4,727,569
[45] Date of Patent: Feb. 23, 1988

[54] HARDWIRE AIRPLANE TELEPHONE APPARATUS

[75] Inventors: Wolfgang A. Kutrieb, Whitetail Dr., Chetek, Wis. 54728; John M. Kurschner, Prairie Farm, Wis.; Alan E. Dobrowolski, Chetek, Wis.; John A. Larson, Chetek, Wis.; Scott L. Robinson, Chetek, Wis.

[73] Assignee: Wolfgang A. Kutrieb, Chetek, Wis.

[21] Appl. No.: 830,197

[22] Filed: Feb. 18, 1986

[51] Int. Cl.⁴ .............................................. H01Q 7/04
[52] U.S. Cl. ................................... 379/58; 379/433; 379/438; 379/144; 379/91; 235/380; 455/90
[58] Field of Search ..................... 379/63, 91, 144, 60, 379/96, 438, 437; 235/375, 376, 379, 380, 381; 381/86; 340/825.34; 358/86; 455/90

[56] References Cited

U.S. PATENT DOCUMENTS

| | | | |
|---|---|---|---|
| 955,923 | 3/1910 | Thompson | 379/433 |
| 4,018,998 | 4/1977 | Wegner | 379/433 |
| 4,056,696 | 11/1977 | Meyerle et al. | 179/100 R |
| 4,384,288 | 5/1983 | Walton | 340/825.34 |
| 4,399,330 | 8/1983 | Kuenzel | |
| 4,471,165 | 9/1984 | DeFino et al. | 379/96 |
| 4,521,021 | 6/1985 | Dixion | 273/148 B |
| 4,523,087 | 6/1985 | Benton | 235/379 |
| 4,584,603 | 4/1986 | Harrison | 358/86 |
| 4,640,986 | 3/1987 | Yotsutani et al. | 379/60 |
| 4,646,987 | 3/1987 | Peterson | 242/107.11 |
| 4,647,980 | 3/1987 | Steventon et al. | 358/254 |

Primary Examiner—Robert Lev
Attorney, Agent, or Firm—Clayton R. Johnson

[57] ABSTRACT

Telephone apparatus mounted on an airplane food and beverage tray which is pivotable from a storage position nearly flush with the back of a seat of an airplane to a position of use, and includes a telephone handset that in a storage position in a tray recess is substantially flush with the surface of the tray that the recess opens through, the handset including a microphone portion and a combination credit card reader and speaker portion resiliently urged to an inclined condition relative to the microphone portion, latch mechanism to releasably retain the handset in the tray recess, a reel mounted in the tray that is resiliently retained in a datum position that the telephone cord connected to the handset is tightly wound and the second telephone cord that is electrically connected in the reel to the first cord is loosely wound, the second cord being connected to a terminal on a wall of the airplane which in turn is electrically connected through a computer to the primary telephone transmitter. The telephone apparatus may also be used on a desk to in a non-use condition be flush with the desk top.

8 Claims, 7 Drawing Figures

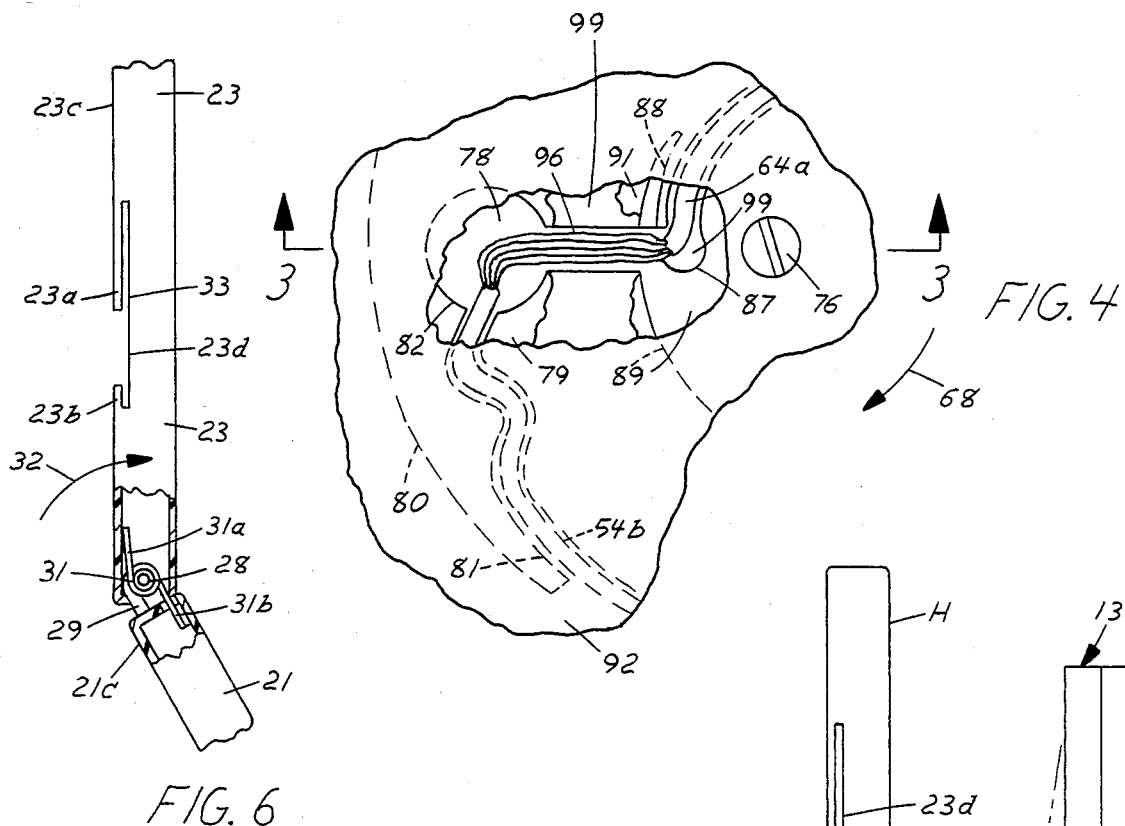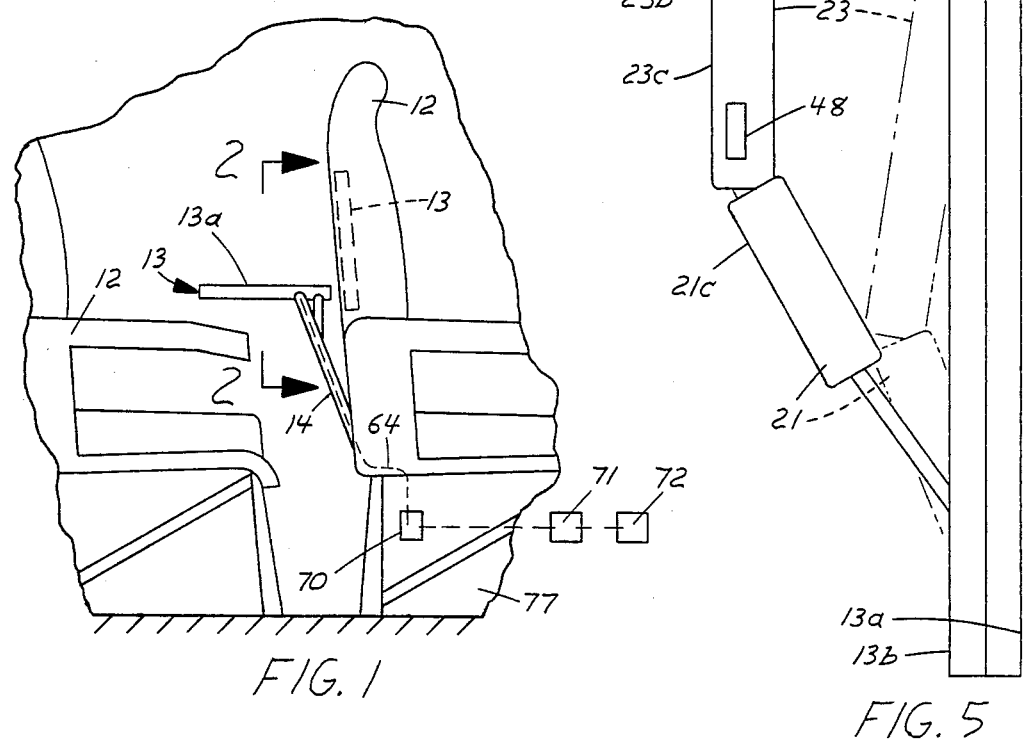

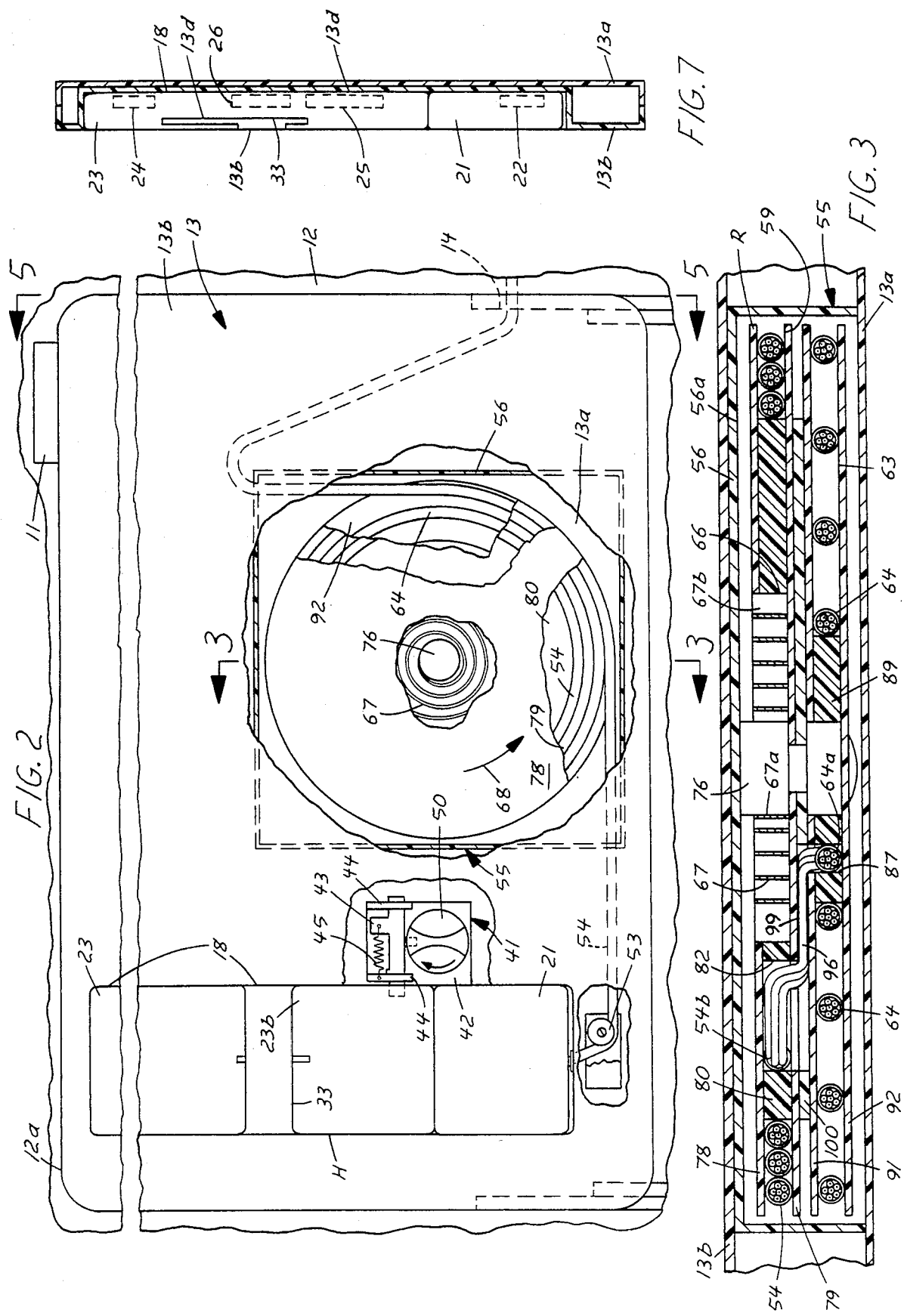

HARDWIRE AIRPLANE TELEPHONE APPARATUS

BACKGROUND OF THE INVENTION

Telephone apparatus for use by passengers in an aircraft.

It is old to have hardwire telephones installed on bulkheads of aircraft at selected stations for use by the passengers at those stations. However when the passengers have to remain seated because of take-off, landing, turbulence and etc., the passengers do not have access to such telephones. Further the telephones are remote from the passenger seats.

Also it is old to have wireless telephones provided in airplanes wherein the handset mount includes a credit card slot and reader. In this type of system one has to walk to the phone station, insert and leave the credit card in the handset mount to release the handset, then carry the handset back to the passengers seat, and after use, replace the handset and retrive the credit card. However with this type of system the passenger is precluded from obtaining the handset during the times the passenger is required to remain in a seat belt buckled-up condition. Further it is very inconvient to obtain a handset during the time meals are being served, and in particular when ones seat is not located on the isle.

In order to overcome problems such as the above, as well as others, this invention has been made.

SUMMARY OF THE INVENTION

Telephone apparatus that includes a handset that during non-use is located in a recess of a tray or desk to be substantially flush with the surface through which the recess opens and is connected through cords between the handset and a terminal on a wall or similar surface, and a reel that is resiliently retained in a datum condition and mounts one of the cords to unwind as the handset is removed from the recess and a second cord hardwired to the first cord which is more tightly wound as the handset is removed from the recess.

One of the objects of this invention is to provided a new and novel handset that is relatively compact. In furtherance of the above object, it is another object of this invention to provide a new and novel handset and credit card reader combination. A further object of this invention is to provide a new and novel combination of a handset and handset mounting apparatus. In furtherance of the last mentioned object it is another object of this invention to provide a novel handset and latching mechanism wherein the handset has a microphone portion and a speaker portion that in a datum condition in the mounting apparatus are latched in generally linear relationship to one another and upon releasing the latch mechanism move to an inclined relationship relative to one another.

A different objective of this invention is to provide new and novel means for electrically connecting a handset to a fixed telephone terminal wherein as the handset is moved from a datum non-use position the telephone cord is unreeled and when the handset is moved to its datum position the cord is automatically reeled up. A further object of this invention is to provide a new and novel means of mounting a handset and electrically connecting the handset to a fixed telephone terminal on a bulkhead or the like. In furtherance of the last mentioned object it is another object of this invention to provide a new and novel combination of a handset and an aircraft passenger seat food and beverage tray and manner of hardwiring the handset to a fixed terminal on an aircraft bulkhead or wall.

BRIEF DESCRIPTION OF THE DRAWINGS

FIG. 1 is a fragmentary side view of a pair of adjacent rows of airplane passenger seats showing a serving tray that mounts the handset of this invention in a position of use in solid lines and in a storage position in dotted lines and schematically showing portions of the telephone system;

FIG. 2 is a fragmentary transverse view generally taken along the line and in the direction of the arrows 2—2 of FIG. 1 other than the tray is shown in its storage position, portions of the adjacent tray wall and reel being broken away;

FIG. 3 is a fragmentary cross sectional view of the tray that is generally taken along the line and in the direction of the arrows 3—3 of FIGS. 2 and 4;

FIG. 4 is a fragmentary view of the reel with various portions broken away to show the hardwire connection between two oppositely wound cord portions on the reel;

FIG. 5 is an end view of the tray with the handset being shown in a position remote from the tray in solid lines and in an unlatched position before being removed from the tray recess in dotted lines;

FIG. 6 is a fragmentary view of the handset with portions of the handset housings broken away to show the pivotal connection between the microphone and speaker portions, and FIG. 7 is a cross sectional view of the tray that is generally take along the line and in the direction of the arrows 7—7 of FIG. 1 to show the handset in its latched position in the tray handset recess, various conventional components that form parts of the handset being schemedically shown by dotted line boxes.

Referring to the drawings a food and beverage tray, generally designated 13, is mounted on the back of an airplane passenger seat 12 by convential linkage mechanism 14 for movement between a lowered position for supporting a tray on the then top surface 13a and a folded up, storage position latched in the seat recess 12a in a conventional manner by latch mechanism schematically shown as 11. The tray which is of a generally rectangular shape, is elongated in a direction transverse to the elongated length of the airplane, has wall portions defining a recess 18 that is elongated in a longitudinal direction and opens through tray surface 13b which usually is substantially planar and faces rearwardly when the tray is in its storage position of FIGS. 2 and 3. Surface 13b is on the opposite of the tray from surface 13a.

The handset H includes a microphone portion having a generally rectangular box shaped housing 21, a generally rectangular box shaped speaker housing 23, a conventional noise canceling subminature microphone mounted in the microphone housing and schematically shown as box 22 (see FIG. 7), a speaker mounted in the speaker housing and schematically shown as box 24, a keyboard 25 mounted by the speaker housing for dialing, and a card reader mounted by the speaker housing and schemateically shown by box 26. Recesses (not shown) are provided in housing 21, 23 for mounting members 22 24, 25.

On end portion of the microphone has tabs 29 extended into the adjacent open end portion of the speaker housing and that are pivotally connected thereto by a pivot 28 (see FIG. 6). The pivot is extended through a coil spring 31 that has one end portion 31a acting against the speaker housing and an opposite end portion 31b acting against the microphone housing to resiliently urge the speaker housing to pivot in the direction of arrow 32 relative to the microphone housing. The pivotal movement in the direction of arrow 32 is limited to the inclined angular relationship indicated in FIG. 6 by a portion of the speaker housing abutting against a non-tabbed portion of the microphone housing. It is to be noted that as shown in FIG. 6 the manner of pivotally connecting housings 21, 23 is such that one housing extends generally linearly of the other in end to end relationship with the wiring (not shown) for the keyboard, speaker and credit card reader extending from within housing 23 to the interior of housing 21 through the adjacent open end portion thereof. When housings 21, 23 extend linearly relative to one another, their back surfaces 21c, 23c are substantially coplanar.

A longitudinally intermediate portion of the speaker housing has a portion therof cut away to provide a card slot 33 for having a major credit card slid therethrough, the housing having portions 23a, 23b spaced from one another for being in overlapping relationship to the top and bottom edge portions respectively of the card and on the opposite side thereof from the recessed wall portion 23d (which in part defines the slot) as the card is slid through the slot. Further the slot is of dimensions to prevent tilting or wobbling of the card as it is slid through the slot so that the numbers thereon can be accurately sensed by the credit card reader 36.

In order to releasably retain the handset in the tray recess with the back surface 21c of the microphone housing substantially coplanar with the back surface 23c of the speaker and the surface 13b of the tray, there is provided latch mechanism, generally designated 41, that includes a latch housing 42 mounted within the tray. A pair of latch mounts 44 are mounted by housing 42 and slidably mount a latch bar 43 for movement between a release position and a latched position extending into the latch recess 48 that is provided in the speaker housing. A spring 45 resiliently retains the latch bar in its latched position while a knob 50 rotatably mounted by housing 42 has a latch bar protrusion extended into a knob cut-out so that when the knob is rotated in one direction it will move the latch bar to its release position. An aperture (not shown) is provided in wall 13b so that knob 50 can be turned and still be recessed within the tray (not protrude outwardly of the tray).

A telephone cord 54 having appropriate wiring contained therein has one end connected to the microphone housing with the wiring connected to the components in the handset housings so that the components can perform their conventional functions. The cord 54 extends from the handset, through an aperture (not shown) provided in one of the wall portions defining the tray recess 18, thence partially around an idler roller 53 that is mounted within the tray, thence to the reel assembly, generally designated 55, to extend through an aperture (not shown) in one of the walls of an open, generally rectangular box shaped housing 56 and into an annular groove 59 that is defined by disk shaped reel members 78, 79 and hub member 80 to a well 82 provided in said hub member and disk member 79.

A telephone cord 64 has one end portion 64a extending from a well 87 in reel hub portion 89 to pass through a passage 88 in hub portion 89 to the annular groove 63 that is defined by hub portion 89 and reel disk members 91, 92. From the groove 63 the cord extends through an aperture (not shown) in a wall of the reel housing, thence through an end wall aperture (not shown) of the tray to extend along linkage 14 in an appropriate manner (i.e. attached thereto in a manner that will not interfer with the movement of the linkage and tray relative to one another and the seat), and along the seat and thence to have its opposite end portion suitably connected to a telephone terminal 70 mounted by the bulkhead 77 of the airplane. The terminal is suitably connected through a computer 71 to the aircraft telephone transmitter 72 which do not form part of this invention.

Telephone wiring 96 has one ends integrally joined to the ends of the wiring of cord portion 54b which extends into well 82 and extends through a passage 99 provided in reel spacer disk member 100 to pass through an aperture in disk member 99 and into well 87 to have its opposite end portions integrally joined to the wiring of cord portion 64a that extends into well 87. The spacer is located between disk mmebers 79, 81. Thus telephone-credit card reader cords 54, 64 and wiring 96 may be in actuality be one cord with the cord insulation stripped off of the wiring contained therein (but not off the wires) where it extends between wells 82, 87. Alternately cords 54, 64 may be two separate cords having their ends suitably connected in the reel to form a fixed hardwire electrical connection betwenn the corresponding wires of each of the cords. It is to be understood that the terminology hardwire connection does not include a connection such as provided through slip rings and brushes or sliding electrical connections, but does include a connection such as obtained if each wire of cord 54 was, for example, soldered to one end of an insulated wire that in turn has its opposite end soldered to the adjacent end of a corresponding wire of cord 64. Cord end portions 54b, 64a are mounted by the reel such that wiring 96 remains stationary relative to the reel even when the cord 54 is pulled to rotate the reel, or when the reel returns to its datum position.

The reel is rotatably mounted on a hub 76 that is joined to wall 56a of the reel housing 56 to be in a fixed relationship to the housing. A recoil leaf spring 67 which is located in a central aperture 66 of the hub portion 82 and disk member 78 has one end portion 67a fixedly attached to hub 76 and an opposite end portion 67b fixedly attached to hub portion 80 to constantly resiliently urge the reel to rotate in the direction of arrow 68 to a datum handset cord 54 fully wound position. In the reel datum position the handset is located in the tray recess with the part of the cord that extends from the handset to the reel in tension and the remainder of the cord 54 tightly wound around hub portion 80. At the same time the portion of cord 64 between disk members 91, 92 is loosely wound and is wound about hub portion 89 in direction opposite the winding of cord 54 about hub portion 80. It is to be noted reel members 78–80, 89, 91, 92, 100 are retained in a fixed angular relationshop by suitable means (not shown) to rotate as a single unit about the central axis of hub 76. As a result when the handset is moved away from the tray the reel is rotated in the direction opposite arrow 68 to unwind cord 54 and to more tightly wind cord 64 and spring 67. However when the handset is moved toward the tray recess the spring 67 will result in the reel rotating to wind cord 54.

A suitable disconnect button (not shown) may be provided on the handset to discontinue the telephone connection once the telephone conversation has been completed. Additionally suitable conventional signal lights (not shown) may be provided on the handset.

In using this invention, while the tray 13 is located in its stored dotted line position of FIG. 1, knob 50 is rotated to retract latch 43. Upon the latch being retracted the spring 31 will resiliently move the microphone and speaker portions relative to one another to the dotted line position of FIG. 5 whereby the handset may be manually grasped and removed from the tray recess. When the speaker portion has moved to the dotted line position of FIG. 5, the handset recess 48 has moved away from a position that latch 43 can extend into the handset recess and accordingly even though the knob is released and latch 43 resiliently returns to its datum latched position, the handset can be moved away from the seat on which tray 13 is mounted.

Upon moving the handset away from the tray, the pulling on the cord 54 causes the reel to rotate in a direction opposite arrow 68 to wind spring 67 and more tightly wind cord 64 (but not move the portion of cord 64 that extends exteriorly of the reel housing). Now the user can slid his major credit card through slot 33 which, if the card is valid, will actuate the handset to generate a dial tone. It is noted that a suitable signal light (not shown) may be provided on the handset to indicate whether or not there is an available airplane telephone circuit. Once the handset is actuated the number may be dialed by depressing the keys of the keyboard 25.

Once the telephone call has been completed a disconnect button (not shown) on the handset may be pushed to deactuate the telephone circuit and then the handset move toward the tray recess. As the handset is thus moved, spring 67 will rotate the reel to take up the slack in cord 54 and result in cord 64 being more loosely wound. After the handset has been moved to the dotted line position of FIG. 5, the adjacent end portions of the microphone and speaker portions are pushed toward the wall portion 13d that in part define the tray recess so that the handset portions relatively pivot to a position surfaces 21c, 23c are coplanar with tray surface 13b. As the handset portions are thus pushed, due to a bevel (not shown) provided on latch 43, the latch 43 moves against the action of spring 45 to its unlatched position as the speaker portion abuts against the latch, and when recess 48 is aligned with the latch, the latch is resiliently moved to its latching position extending within the recess 48 to retain the handset in the tray recess.

If, for example, there are three seats in side by side relationship on one side of an isle, the serving tray on only the middle seat may be provided with the telephone apparatus of this invention to limit the number of handsets in the airplane, but still be easily accessible to all the passengers. The only time that the passenger in the middle seat would be inconvenience by the isle passenger reaching across the space directly in front of the middle passenger would be when the isle passenger was unlatching and moving the handset from the tray recess and returning the handset to the tray recess. Also with the credit card slot in the handset the isle passenger can use the credit card without reaching in front of the middle seat passenger and retain possession of the card at all times.

By mounting the handset to be removed from side 13b of the tray, when the tray 13 is in its position for supporting food and/or beverages, access of food and beverages to the handset is precluded. At the same time neither the handset nor knob 50 extend below surface 13b to bump against the passengers body. Further when the tray is in its storage position, the handset and knob 50 do not protrude outwardly of surface 13b, and thus are not likely to be accidently bumped. Additionally the handset is available when the tray has to remain in its stored condition during, for example turbulent weather.

Additionally with the hardwire connection between cords 54, 64 and the provision of the reel, cord 54 is retained in a tensioned condition while at the same time avoiding problems such as loss of power due to corrosion, dirt and etc. which would occur if, for example, a slip ring type connection were used. This is particularly important in that low voltages and currents are being used.

With the handset being hardwired and being attached by a cord to the tray, it can not be stolen without breaking the cord. At the same time the handset is located in a position it can be used by a passenger without having to leave his seat, and thus available for use even though the passenger is required to remain seated with his seat belt buckled. Accordingly this invention provides a greater convenience to passengers than the prior art types of wireless handsets which are located at a bulkhead and are carried back to ones seat when the handset is to be used.

The handset is of a compact nature, for example of a maximum thickness to be located in a recess of an airplane passenger service tray that is about ⅝" to ¾" thick. The width of the microphone and speakers portions are the same widths while the length of the speaker portion is advantageously about 2 to 3 times that of the microphone portion.

Advantageously the speaker 24 may be a model 6257-4, made by Telex, Inc.; the keyboard 25 a 3×4 tactiletype subminature matrix keyboard made by Nissei Sangyo America Ltd.; the magnetic card reader 36 a model 60 made by American Magnetics Corporation; the handset tone generating circuit (not shown), model MK5380, made by United Technologies Mostek; and the microphone 22, model BW 1789 noise canceling subminature, made by Knowles Electronics, Inc.

Even though not previously mentioned, it is to be understood the tray may be made of two parts suitably connected to one another to permit access to the reel assembly, idler roller and latch assembly that are mounted therein, that the reel assembly may be suitable removably attached to one of the tray parts, and that the hub 76 may be made up of more than one part for removably attaching the reel to the reel housing. Further it is to be understood that the reel may be of a construction other than that illustrated as long as it has two annular grooves to permit reverse coiling of cords 54, 64, and cord end portions 54b, 64a being hardwire connected and retained in fixed relationship to the reel.

Even though the telephone apparatus has been described with refernce to an airplane seat service tray, it is to be understood that the latch mechanism 41, roller 53 and reel assembly 55 could be mounted by a desk top such that only the knob 50 was visible and that the desk top provided with a handset recess 18 that opened through the generally planar top surface of the desk top whereby when the handset was latched in the desk recess 18 the handset surfaces 21c, 23c would be substantially flush with the desk top surface. If the desk is to be used in a private office, than the credit card slot and magnetic card reader could be dispensed with whereby the surface 23c would be planar across substantially the entire length and width of the speaker housing (not have a recessed back surface portion 23d). Thus the desk could be provided with a telephone that does not extend above the desk top and the cord would not be extending at least in part across the top of the desk.

Not previously mentioned is that preferrably the openings in handset housings to the speaker and microphone are on the sides thereof opposite surfaces 23c, 21c so that foreign material can not pass therethrough when the handset is in its latched storage position.

What is claimed is:

1. Airplane telephone apparatus comprising a a bulkhead, an airplane passenger seat having a back portion that has a back surface, a food and beverage tray recess opening through the back surface, a food and beverage tray having a tray supporting surface and an opposite surface, means for mounting the tray on the seat back for movement between a storage position in the seat recess with the tray opposite surface facing rearwardly and a serving position with the tray opposite surface facing downwardly, the tray having a tray recess, a telephone handset having a microphone portion and a speaker portion, said handset being movable between a storage position in the tray recess and a use position outwardly of the tray recess, a telephone terminal mounted on the bulkhead, a reel mounted in the tray for rotation and resiliently retained in a datum wound condition, a telephone cord having a first cord portion that has one end attached to the handset and an opposite end portion connected to the reel for being unwound as the handset is moved away from the tray recess and a second cord portion having one end electrically connected to the first cord portion and a second end portion electrically connected to the terminal, the handset including pivot means for pivotally connecting the speaker portion and microphone portion together for limited pivotal movement between a limit use position that the microphone portion extends at an inclined angle relative to the speaker portion and a limit storage position that the microphone portion extends generally linearly away from the speaker portion, the microphone and speaker portions having cooperating means for limiting pivotal movement from the storage position toward the use position and resilient means for urging the microphone and speaker portions to their use position and resiliently retaining them in their use position.

2. The apparatus of claim 1 further characterized in that the first cord portion has part thereof wound in one direction on the reel and the second cord portion has part thereof wound in the opposite direction on the reel whereby as the handset is moved away from the tray recess the first cord portion is unwound and the second cord portion is more tightly wound.

3. The apparatus of claim 1 further characterized in that there is provided operative means for releasably latchingly retaining the handset in the tray recess in the storage position of the microphone and speaker, and that the microphone portion has a generally planar surface and that the speaker portion has a generally planar surface, said microphone and speaker portion surfaces being substantially flush with the tray opposite surface when the handset is latchingly retained in the tray recess.

4. Telephone apparatus adapted to be connected to a telephone terminal comprising a handset having a microphone portion and a speaker portion, means for mountingly supporting the handset and permitting movement of the handset away therefrom, a reel rotatably mounted within the mounting means that is resiliently retained in a datum handset cord wound condition, a handset telephone first cord that has one end portion and in part being wound on the reel to rotate the reel in an unwinding direction as the handset is moved away from the handset mounting means, a second telephone cord that has a first end portion and a second end portion adapted to be connected to said terminal and that in part is loosely wound on the reel in an opposite direction from the winding of the first cord to be more tightly wound when the handset is moved away from the handset mounting means and means mounted on the reel for movement therewith and that is joined to the first cord second end portion and joined to the second cord first end portion to form a hardwire telephone connection therebetween, and characterized in that the handset includes a credit card reader and a credit card slot.

5. The apparatus of claim 4 further characterized in that the handset includes means for hingedly connecting the microphone and speaker portions to permit relative movement between a position that they extend generally linearly relative to one another and a second position extending at an inclined angle relative to one another and constantly resiliently urging them to their second position, and that the latching means, when the handset is latchingly retained in the recess, retains the handset so that the microphone and speaker portion are retained in their relative first position.

6. The apparatus of claim 4 further characterized in that the means defining the generally planar surface comprises an airplane seat food and beverage tray that has the reel mounted therein, and that the handset mounting means includes an airplane passenger seat having the tray mounted thereon.

7. Airplane telephone apparatus comprising a bulkhead, an airplane passenger seat having a back portion that has a back surface, a food and beverage tray recess opening through the back surface, a food and beverage tray having a tray supporting surface and an opposite surface, means for mounting the tray on the seat back for movement between a storage position in the seat recess with the tray opposite surface facing rearwardly and a serving position with the tray opposite surface facing downwardly, the tray having a tray recess, a telephone handset having a microphone portion and a speaker portion, said handset being movable between a storage position in the tray recess and a use position outwardly of the tray recess, a telephone terminal mounted on the bulkhead, a reel mounted in the tray for rotation and resiliently retained in a datum wound condition, a telephone cord having a first cord portion that has one end attached to the handset and an opposite end portion connected to the reel for being unwound as the handset is moved away from the tray recess and a second cord portion having one end electrically connected to the first cord portion and a second end portion electrically connected to the terminal, the speaker portion including a magnetic card reader and means defining a slot for a credit card.

8. Telephone apparatus adapted to be connected to a telephone terminal, comprising a handset that includes a microphone portion having a generally planar surface and a speaker portion having a generally planar surface, means for mountingly supporting the handset that includes a generally planar surface and a handset recess opening to the means for mountingly supporting the handset planar surface for having the handset positioned therein with the microphone and speaker portions surfaces generally coplanar to the mounting surface, a reel rotatably mounted within the mounting means that is resiliently retained in a datum handset telephone cord wound condition, a handset telephone cord having one end portion attached to the handset and an opposite second end portion attached to the reel and in part being wound on the reel to rotate the reel in an unwinding direction as the handset is removed from said recess, the handset including a magnetic credit card reader and a credit card slot for having the credit card moved therethrough to be sensed by the card reader.

* * * * *